US009747566B2

United States Patent
Ng et al.

(10) Patent No.: US 9,747,566 B2
(45) Date of Patent: Aug. 29, 2017

(54) METHOD AND SYSTEM FOR MANAGING QUEUES

(71) Applicant: Solv Concepts Technology Limited, Hong Kong (HK)

(72) Inventors: Chung Man Ng, Hong Kong (HK); Wai Hung Edmond Cheung, Hong Kong (HK)

(73) Assignee: SOLV CONCEPTS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 15/289,968

(22) Filed: Oct. 11, 2016

(65) Prior Publication Data

US 2017/0161670 A1    Jun. 8, 2017

(30) Foreign Application Priority Data

Dec. 3, 2015    (HK) .................................. 15111966

(51) Int. Cl.
| | | |
|---|---|---|
| *G06Q 10/00* | (2012.01) | |
| *G06Q 10/02* | (2012.01) | |
| *H04W 4/02* | (2009.01) | |
| *G06Q 10/06* | (2012.01) | |

(Continued)

(52) U.S. Cl.
CPC ... *G06Q 10/063114* (2013.01); *G06K 7/1417* (2013.01); *G07C 11/00* (2013.01); *G07C 2011/04* (2013.01)

(58) Field of Classification Search
None
See application file for complete search history.

(56) References Cited

U.S. PATENT DOCUMENTS

2011/0307547 A1\* 12/2011 Backer .............. G06Q 10/1095
709/203
2012/0158934 A1    6/2012 Xiao et al.
(Continued)

FOREIGN PATENT DOCUMENTS

| CN | 102956052 A | 3/2013 | |
|---|---|---|---|
| EP | 2913785 A1 | 9/2015 | |
| RO | EP 2913785 A1 \* | 9/2015 | ............ H04W 4/003 |

OTHER PUBLICATIONS

Search report of counterpart Hong Kong Short-term Patent Application No. 15111966.0 issued on Dec. 18, 2015.

(Continued)

*Primary Examiner* — Nadja Chong Cruz

(57) ABSTRACT

Disclosed is a system and method for managing a queue of one or more service requests. In accordance with the system and the method, a queue of one or more service requests pertaining to one or more services delivered through a service location is created. Further, a queue registration request is received from a user device in order to register a service request associated with a user in the queue. Further, the queue registration request is processed to register the service request in the queue thereby recording a position of the service request in the queue. Further, the status of the queue is monitored in order to track change in the position of the service request of the user in the queue. Furthermore, the status of the queue is updated to the user on the user device thereby indicating the change in position of the service request to the user.

13 Claims, 10 Drawing Sheets

(51) Int. Cl.
*G06K 7/14* (2006.01)
*G07C 11/00* (2006.01)

(56) References Cited

U.S. PATENT DOCUMENTS

2014/0180960 A1 6/2014 Sagfors et al.
2015/0025919 A1 1/2015 West

OTHER PUBLICATIONS

Combined Search and Examination Report of counterpart British Patent Application No. 1620392.9 dated Jun. 6, 2017.

* cited by examiner

METHOD AND SYSTEM FOR MANAGING QUEUES

CROSS-REFERENCE TO RELATED APPLICATIONS AND PRIORITY

The present application claims priority from Hong Kong Patent Application No. 15111966.0 dated Dec. 3, 2015, incorporated herein as a reference.

TECHNICAL FIELD

The present subject matter described herein, in general, relates to a system and method for managing one or more queues accommodating one or more service requests.

BACKGROUND

In day-to-day life, customers often visit various service locations catering different services to various customers. For example, the services catered may include food and beverage service, banking and finance service, medicinal service, an airline service, any public sector service such as issuing a passport, and the like. Typically, for subscribing to any of the services, the customer visits the respective service location and submits a request for availing/subscription of the services. Usually, a kiosk machine may be provided at the service location for submission of a request to subscribe a desired service by the customer. The customer may input information prompted by the kiosk machine in order to complete the service registration form. Based upon the completion of the form, the kiosk machine may generate a unique token number for the customer. The unique token number indicates the customer's position in a queue containing multiple requests received from other customers for subscription of the same service.

Now, in order to track his/her turn for subscription of the service in the queue, the customer may have to continuously monitor the token numbers displayed on the screen placed within the vicinity of the service location. The screen may display the status of the queue by showing a token number currently being served, the token number(s) already being served and one or more upcoming token number(s) to be served after a probable time period. However, the existing method discussed above creates challenges for the customer. Firstly, the customer may have to constantly monitor the status of the token number(s) displayed via the screen, the failure of which may result in missing the customer's turn of availing to the desired service. This may, in turn, delay the service being served to the customer and/or cancellation of the delivery of the service itself. This is because, the service may be valid for a particular time period. Secondly, since there may be large number of service requests already in the queue and the customer's turn is anticipated after pretty long time, the customer has to maintain his/her presence within the vicinity of the service location in order to track the his/her number in the queue thereby affecting the customer's mobility. Therefore, the customer continues to wait in queue until the customer is called for availing the desired service. This leads in unnecessary wastage of precious time of the customer which could be spend by the customer in performing other fruitful activities such as official work, personal work, shopping, and leisure etc.

SUMMARY

This summary is provided to introduce concepts related to systems and methods for managing queues and the concepts are further described below in the detailed description. This summary is not intended to identify essential features of the claimed subject matter nor is it intended for use in determining or limiting the scope of the claimed subject matter.

In one implementation, a system for managing a queue of one or more service requests is disclosed. The system may comprise a processor and a memory coupled with the processor. The processor may be configured to execute programmed instructions stored in the memory. The processor may execute a programmed instruction for creating a queue of one or more service requests pertaining to one or more services delivered through a service location. The processor may further execute a programmed instruction for receiving a queue registration request from a user device in order to register a service request associated with a user in the said queue. Further, the processor may execute a programmed instruction for processing the queue registration request to register the service request in the said queue thereby recording a position of the service request in the said queue. The processor may further execute a programmed instruction for monitoring status of the queue in order to track change in the position of the service request of the user in the said queue. Furthermore, the processor may execute a programmed instruction for updating the status of the queue to the user on the user device thereby indicating the change in position of the service request to the user.

In another implementation, a method for managing a queue of one or more service requests is disclosed. The method may comprise creating, via a processor, a queue of one or more service requests pertaining to one or more services delivered through a service location. The method may further comprise receiving, via the processor, a queue registration request from a user device in order to register a service request associated with a user in the said queue. Further, the method may comprise processing, via the processor, the queue registration request to register the service request in the said queue thereby recording a position of the service request in the said queue. The method may further comprise monitoring, via the processor, status of the queue in order to track change in the position of the service request of the user in the said queue. Further, the method may comprise updating, via the processor, the status of the queue to the user on the user device thereby indicating the change in position of the service request to the user.

In yet another implementation, a non-transitory computer readable medium storing program for managing a queue of one or more service requests is disclosed. The program may comprise a program code for creating a queue of one or more service requests pertaining to one or more services delivered through a service location. The program may comprise a program code for receiving a queue registration request from a user device in order to register a service request associated with a user in the said queue. Further, the program may comprise a program code for processing the queue registration request to register the service request in the said queue thereby recording a position of the service request in the said queue. The program may further comprise a program code for monitoring status of the queue in order to track change in the position of the service request of the user in the said queue. Further, the program may comprise a program code for updating the status of the queue to the user on the user device thereby indicating the change in position of the service request to the user.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
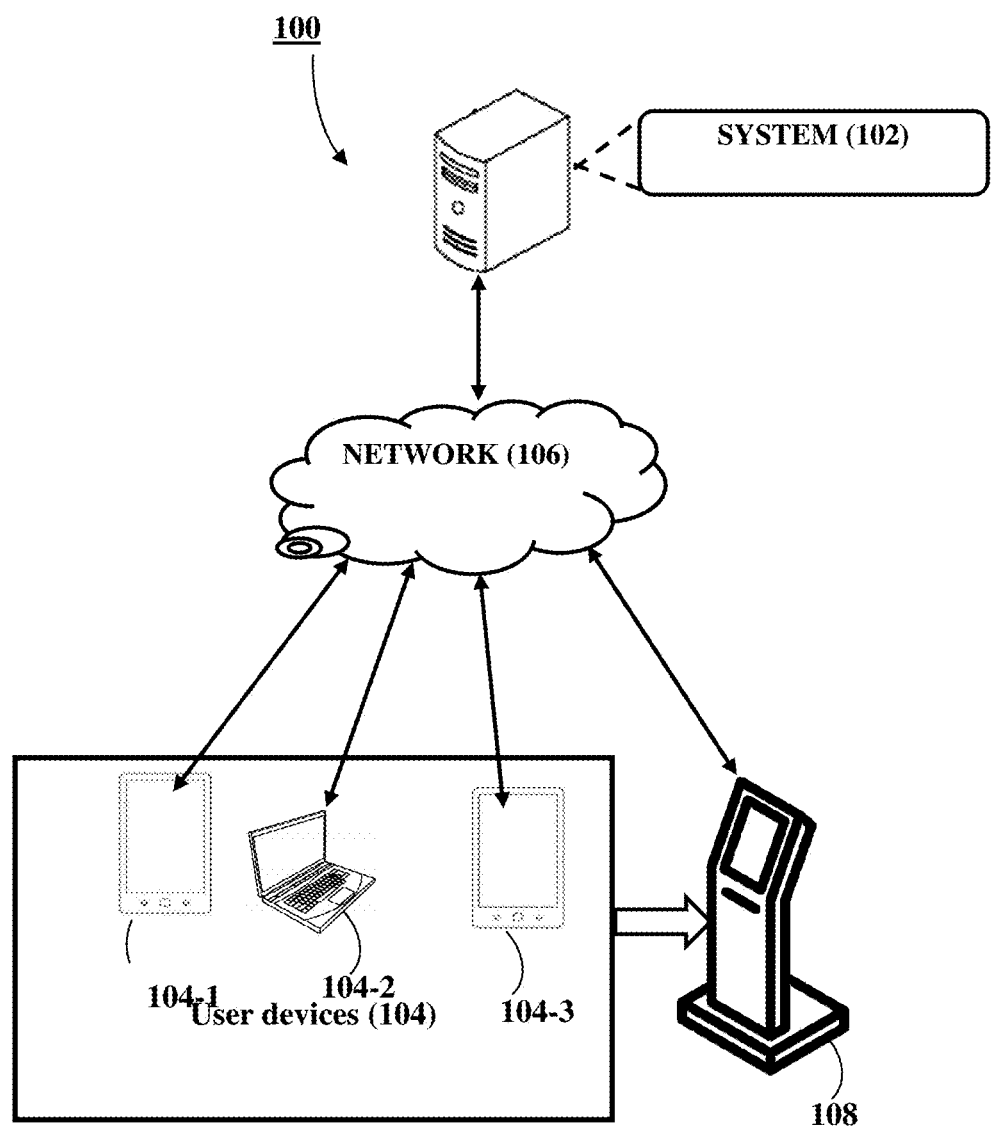
FIG. 1 illustrates a network implementation 100 of a system 102 for managing one or more service requests, in accordance with an embodiment of the present disclosure.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System(s) and method(s) for managing a queue of one or more service requests are described. In accordance with the system(s) and method(s) of the present disclosure, a queue management server communicatively coupled with a kiosk device is provided. The queue management server may maintain one or more queues of multiple service requests received from multiple users via the kiosk device. The queue management server may create each queue for a specific session having a predefined session time. Specifically, the queue management server may check if a particular queue to be created is within the predefined session time set for a particular session. The particular session may be enabled by a session manager present within the queue management server. The particular queue created may be valid until the expiry of the predefined session time and hence may be deleted after the expiry of the predefined session time.

A user may submit a queue registration request to the queue management server for subscribing a queue channel associated to a particular queue. The user may submit the queue registration request via the user device (e.g. a smartphone) communicatively coupled with the said queue management server. The queue registration request may be submitted to register a service request in a queue configured to serve multiple service requests. The queue registration request may comprise a QR-code generated by the kiosk device in response to an input received from the user on the said received kiosk device. The kiosk device may be installed at a service location delivering the desired service. The input received by the kiosk device from the user may include user's name, service desired, number of guests accompanying the user, guest's name, age, residential address, contact number(s) and the like. The kiosk device may fetch the current status pertaining to pending service requests in the queue channel subscribed by the user. Based upon the confirmation from the user, the kiosk device may generate the QR-code and display the QR-code to the user via the kiosk device.

The user may print the QR-code displayed on the kiosk device. Further, the user may scan, via the user device, the QR-code displayed on the kiosk device or the QR-code printed on the print. The user may transmit the QR-code scanned within the queue registration request submitted to the queue management server. The QR-code may comprise a string including at least one of a service location identifier for identifying the service location, a branch identifier for identifying a branch of the service location, a queue identifier for identifying the queue, a date for identifying a date of creation of the queue, a service provider name for identifying the service provider, a last-issued-queue-number for identifying a lastly issued queue number and a last-called-queue-number for identifying a lastly called queue number.

Based upon the receipt of the queue registration request comprising the QR-code, the queue management server may validate the QR-code and the string of the said QR-code in order to register the service request of the user with the queue associated to the queue channel being subscribed. Based upon the registration of the service request with the particular queue, the queue management server may create a position of the service request in the said queue. Once the position of the service request may be created in the queue, the queue management server may continuously monitor the status of the queue in order to track the change in position of the service request in the queue. Specifically, the status of the queue may be monitored to check the change in the position of the service request of the user in the queue based upon completion of the other service requests in the queue.

Further, based upon the monitoring of the status of the queue, the queue management server may update the status of the queue to the user via a notification message sent on the user device. The notification message may be in form of a text message, an audio message, a video message and the like. The user may be updated with the status of the queue at multiple instances of the predefined session time, wherein for each instance, the change in the position of the service request of the user in the queue from the previous instance may be updated. The user may be updated on the user device with the status of the queue until the service request of the user is completed or the queue is deleted (i.e. after the expiry of the predefined session time) by the queue management server, whichever is earlier. It must be understood that since the user is continuously updated with the latest status of the queue and accordingly the position of the user in the queue, the user may move out of the service location and spend some time in performing other fruitful activities like official work, personal work, shopping, and leisure etc., and return to the service location as and when the user's service request is anticipated to be served/completed after a probable time period. While aspects of described system and method for managing a queue of one or more service requests may be implemented in any number of different computing systems, environments, and/or configurations, the embodiments are described in the context of the following exemplary system.

Referring to FIG. 1, a system 102 for managing a queue of one or more service requests is illustrated in accordance with an embodiment of the present disclosure. The system 102 may create a queue of one or more service requests pertaining to one or more services delivered through a service location. The system 102 may further receive a queue registration request from a user device in order to register a service request associated with a user in the said queue. Further, the system 102 may process the queue registration request to register the service request in the said queue thereby recording a position of the service request in the said queue. The system 102 may monitor status of the queue in order to track change in the position of the service request of the user in the said queue. Further, the system 102 may update the status of the queue to the user on the user device thereby indicating the change in position of the service request to the user.

Although the present disclosure is explained considering that the system 102 is implemented as a queue management server (hereinafter the system 102 will be referred as queue management server 102 interchangeably), it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2, 104-3 . . . 104-N, collectively also referred to as user devices 104 hereinafter, or applications residing on the user devices 104. Examples of the user devices 104 may include, but are not limited to, a portable computer, a personal digital assistant, a handheld device, a wearable device, a workstation and the like. The user devices 104 are communicatively coupled to the system 102 through a network 106. Further, the user devices 104 may interact with the kiosk device 108 which is also communicatively coupled to the system 102 through the network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
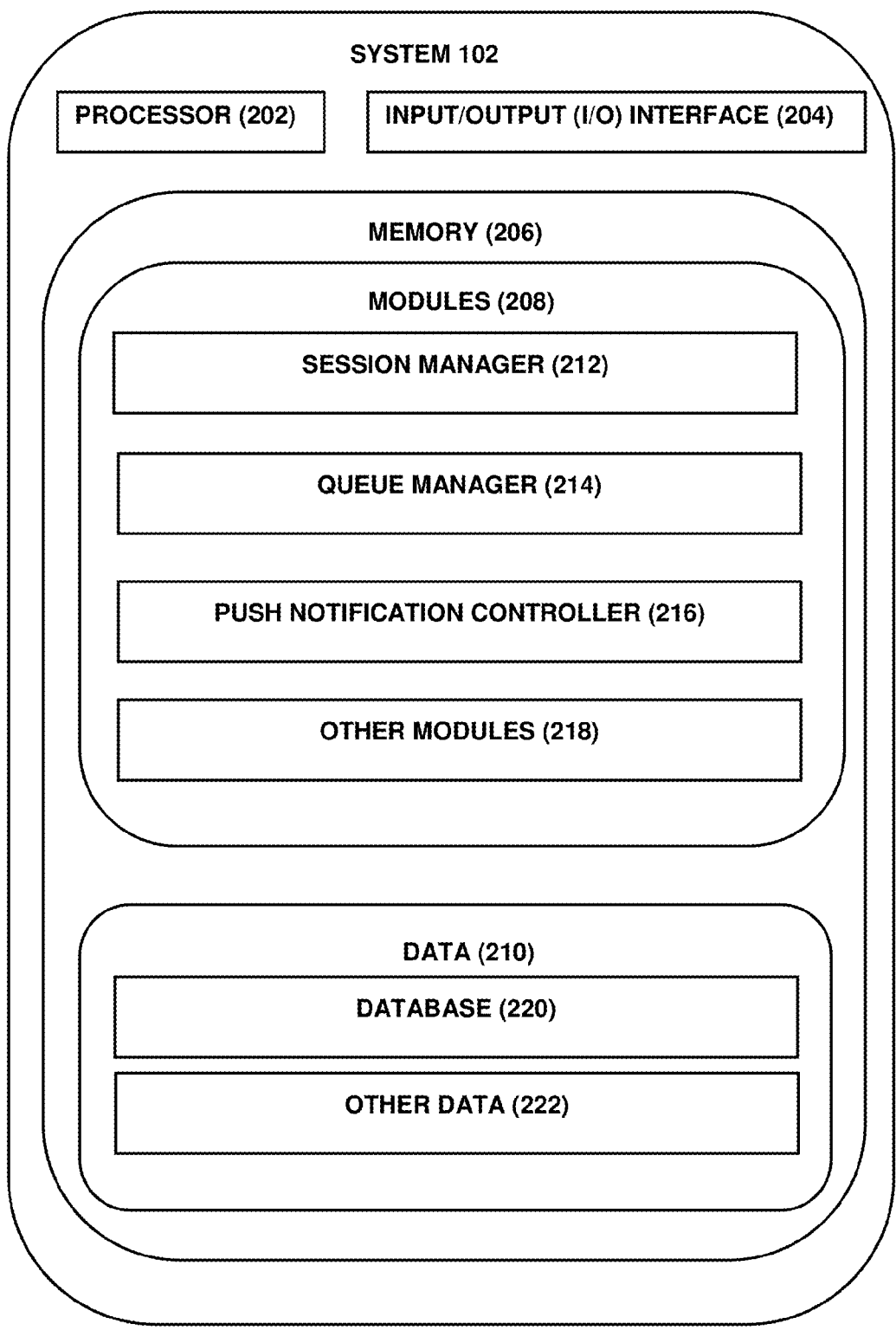
FIG. 2 illustrates the system 102, in accordance with an embodiment of the present disclosure.

Referring now to FIG. 2, the system 102 is illustrated in accordance with an embodiment of the present disclosure. In one embodiment, the system 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable/programmed instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a session manager 212, a queue manager 214, a push notification controller 216 and other modules 218. The other modules 218 may include programs or coded instructions that supplement applications and functions of the system 102.

The data 210, amongst other things, serves as a repository for storing data processed, received, and generated by one or more of the modules 208. The data 210 may also include a database 220 and other data 222. The other data 222 may include data generated as a result of the execution of one or more modules in the other modules 218.

In one implementation, at first, a user may use the user device 104 to access the system 102 via the I/O interface 204. The user may register himselves using the I/O interface 204 in order to use the system 102. The working of the system 102 using the plurality of modules 208 is explained in detail referring to FIGS. 3-10 as explained below.

Figure 3:
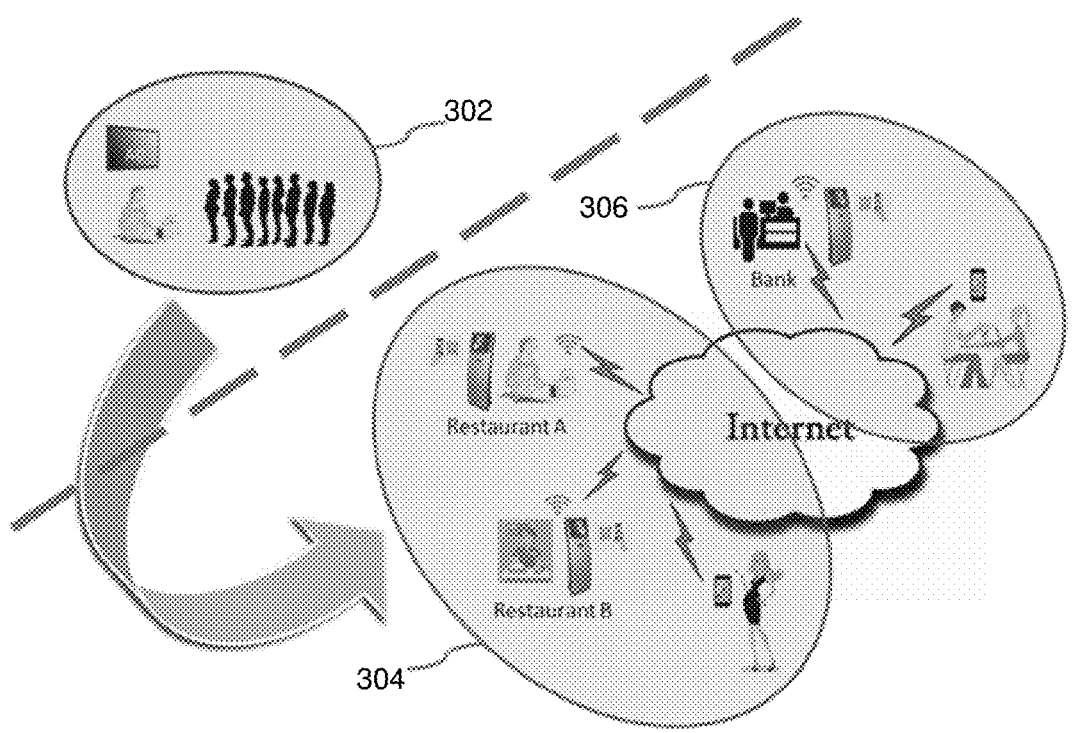
FIG. 3 illustrates one or more service locations implementing the system 102 for managing one or more service requests in the said one or more service locations, in accordance with an embodiment of the present disclosure.

Referring to FIG. 3 illustrates one or more service locations implementing the system 102 for managing one or more service requests in the said one or more service locations, in accordance with an embodiment of the present disclosure. The examples of the service locations may include, but not limited to, a restaurant, a medical clinic, a salon, a bank office, and the like. Each of these service locations may serve the customers (hereinafter referred as users or a user) on first come first serve basis. As illustrated in FIG. 3, block 302 depicts a conventional method adopted by each service location, wherein the users are standing in the queue at the service location premises awaiting respective queue numbers to be called in order to be served with the desired service. However, the disadvantage of the conventional method is that it affects the mobility of the users as the users are not free to move outside the service location premises and the users continue to wait in the queue until their numbers are called for serving the service thereby losing the precious time of the users.

The present system 102 therefore provides an improved methodology of managing queues of service requests, wherein the users joining a particular queue at a service location may be continuously updated with the latest status of the queue while the users may not be in close proximity to the service location thereby enabling the users to utilize their time in performing other activities like official/personal work, shopping and leisure etc. The system 102 may issue a token or a ticket corresponding to a service request from the user, wherein the service request is registered in a queue and the status of queue, including the position of the service request of the user in the queue is regularly updated to the user on the user device 104 thereby indicating the user the latest position of the user's service request in the queue. The system 102 therefore allows the user to depart from the service location until a notification on the user device is received indicating that a queue number of the user's service request in the queue is called by the system 102.

Referring to FIG. 3, blocks 304 and blocks 306 illustrates two different scenarios of utilizing the system 102 for managing one or more service requests. As shown, the block 304 illustrates a scenario, wherein the user may register with two different queues of two different restaurants (e.g. Restaurant A and Restaurant B). In an embodiment, the user may register for four different queues and accordingly four different services at the same instance. The user may be provided with an option to subscribe multiple queue channels so that the user may have a feasibility to avail the service from the service location's queue calling the user's number earlier as compared to other service location's queue channels. It must be noted that, until the user's number is being called, the user may shop in a shopping mall located at a remote place from the said service location. Similarly, the block 306 illustrates a scenario wherein a couple registers a service request with a queue of a bank for availing banking related service and wait in the queue until their queue number is called. Meanwhile, the couple may enjoy a coffee in a cafe as shown in FIG. 3.

It must be understood that the system 102 may provide instant notifications on the user device 104 of the user (shown in the block 304) or the couple (shown in block 306) at regular time intervals. The instant notifications may indicate change in position of the service request of the user or the couple based upon completion/serving of services of the other users ahead in the respective queues. The instant notifications at regular time intervals facilitate the user to shop in the shopping market and the couple to enjoy their coffee without worrying about missing the service being offered by the restaurant and the bank. Thus, in both the scenarios as explained above, the users are able to utilize their waiting time in the queues by performing other activities (e.g. shopping, having a coffee in this case). The methodology adopted by the system 102 to manage the one or more service requests in the queues and thereby notifying the users the status of each queue is further explained in detail referring to FIG. 4 to FIG. 10 as below.

Figure 4:
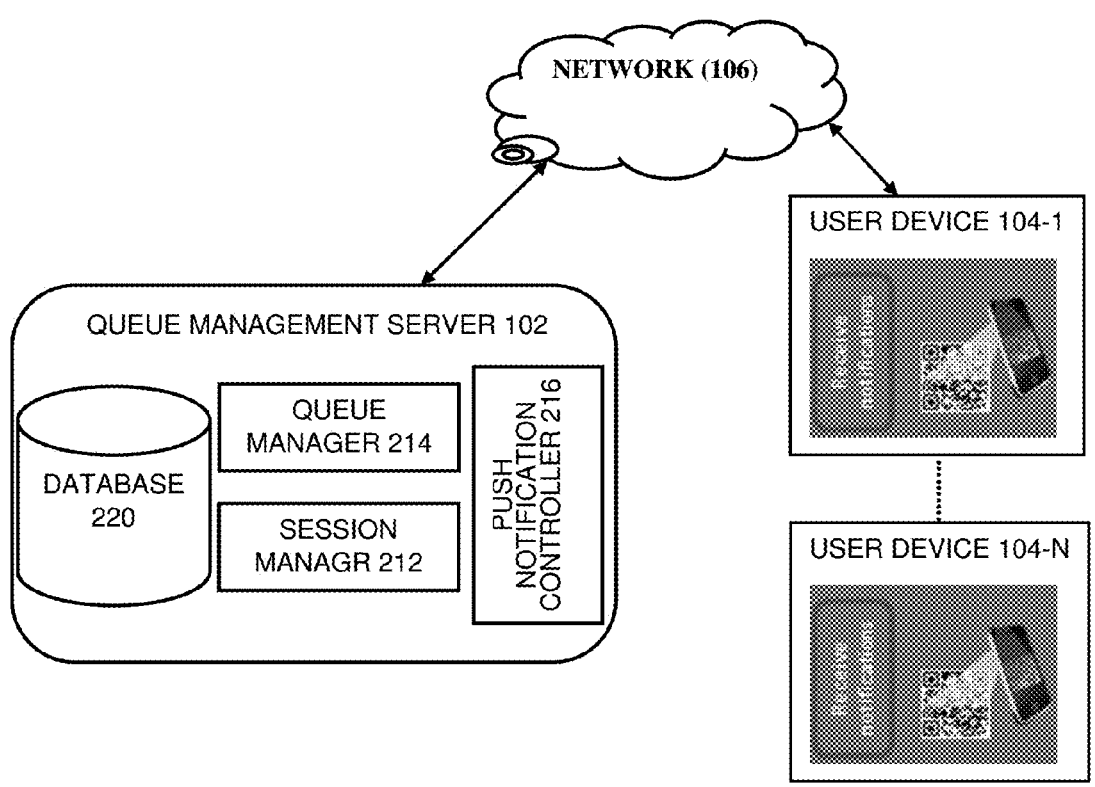
FIG. 4 illustrates the working of the system 102 in conjunction with a user device 104 and a kiosk device 108 communicatively coupled with the system 102, in accordance with an embodiment of the present disclosure.

FIG. 4 illustrates the queue management server 102 along with the user device 104 (hereinafter referred as mobile device 104 interchangeably) and the kiosk device 108 collectively implementing the method of managing the one or more service requests in the queues, in accordance with an embodiment of the present disclosure. In an embodiment, the queue management server 102 is an indicative of a mobile/server application installed on the user, wherein the mobile/server application is being accessed by multiple users using the user devices 104. In one embodiment, a user of the multiple users may be an executive of a service location delivering a specific service. In another embodiment, the user may be a customer interested in availing the specific service being delivered by the said service location. It must be understood that the information/details displayed on the user device, via the I/O interface 204 of the queue management server 102, of the user acting as the executive may vary from those displayed on the user device of the user acting as the customer.

In an embodiment, the queue management server 102 may comprise a session manager 212, a queue manager 214, a push notification controller 216 and a database 220 as shown in FIG. 4. The queue management server 102 may be adapted to facilitate queue management, generating queue status notification and delivering the notification generated to the mobile device 104. In one embodiment, the queue management server 102 may enable the executive of a service location (e.g. a restaurant) to create and maintain, via the queue manager 214, multiple queues of service requests received from multiple customers. In one example, the executive may be enabled to create multiple queues in multiple numbers (e.g. five queues). It must be noted that each queue is created for a predefined session time set for a particular session via the session manager 212 as shown in FIG. 4. The session manager 212 may create a session for a predefined session time such that the queues created is valid until the expiry of the predefined session time.

In addition to the creation of the queue, the queue manager 214 may enable the executive to organize the queue, add customers/users in the queue, increment/advance numbers in the queue and delete the queue. In one example, the queue management server 102, via the queue manager 214, may display on the display of the user device 104 of the executive of the restaurant following information/details pertaining to the status of the queues created:

TABLE 1

Status of the queues displayed on the user device of the executive of the service location (i.e. restaurant in the above example)

| Queue A (1-2 Persons) | Queue B (3-4 Persons) | Queue C (5-8 Persons) | Queue D (9-12 Persons) | Queue E (13+ Persons) |
|---|---|---|---|---|
| A001 Served | B001 Served | C001 Called | D001 Called | E001 Served |
| A002 NA | B002 Served | C002 | D002 NA | E002 Served |
| A003 Served | B003 Called | C003 | D003 NA | E003 Called |
| A004 Served | | | D004 | E004 |
| A005 Served | | | | E005 |
| A006 Served | | | | |
| A007 Served | | | | |
| A008 Called | | | | |

Figure 5A:
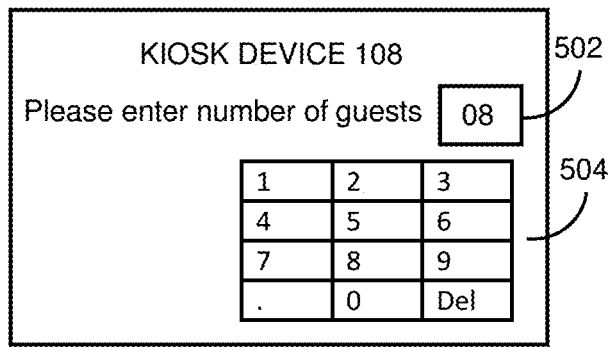
FIG. 5A illustrates an interface of the kiosk device 108, in accordance with an embodiment of the present disclosure.
Figure 5B:
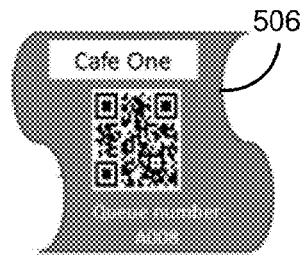
FIG. 5B illustrates a queue ticket generated by the kiosk device 108, in accordance with an embodiment of the present disclosure.

It must be noted that the aforementioned status of each queue may be updated in a real time based upon the serving of the customers in each queue. A new customer (a new user) interested in the food or beverage service of the restaurant may submit a queue registration request to the queue management server 102 via the user device 104 associated to the user. In order to register with the queue, the user may have to register/subscribe with the respective queue channel associated to the queue. For registration of the queue channel, the user may visit the service location (e.g. the restaurant in this case). The user may submit the queue registration request on the kiosk device 108 installed at the service location. The kiosk device 108 may prompt the user to provide input certain details in order to register/subscribe with the particular queue channel. FIG. 5A illustrates an interface of the kiosk device 108 prompting the details from the user. In one example, as shown in FIG. 5A, the kiosk device prompts the user to enter the number of guests visiting the service location (i.e. the restaurant in this case) in a text box 502 provided on the interface of the kiosk device 108. The user may enter the number of guests using the keypad 504 as illustrated in FIG. 5A. Based upon the receipt of the input from the user, the kiosk device 108 may issue a queue ticket or a queue token confirming the registration of the user with the respective queue channel. FIG. 5B illustrates an exemplary queue ticket 506 or queue token (hereinafter referred as queue ticket 506) issued to the user. In one embodiment, the kiosk device 108 is having a touch screen interface capable of receiving input from the users in order to issue queue tickets to the users. The kiosk device 108, being communicatively coupled with the queue management server 102, may fetch the current status of the queue being subscribed by the user and display the status to the user via the display of the kiosk device 108. Further, the queue ticket may be displayed on the display of the kiosk device 108. Furthermore, the queue ticket may be printed via a print function present within the kiosk device 108.

Figure 6:
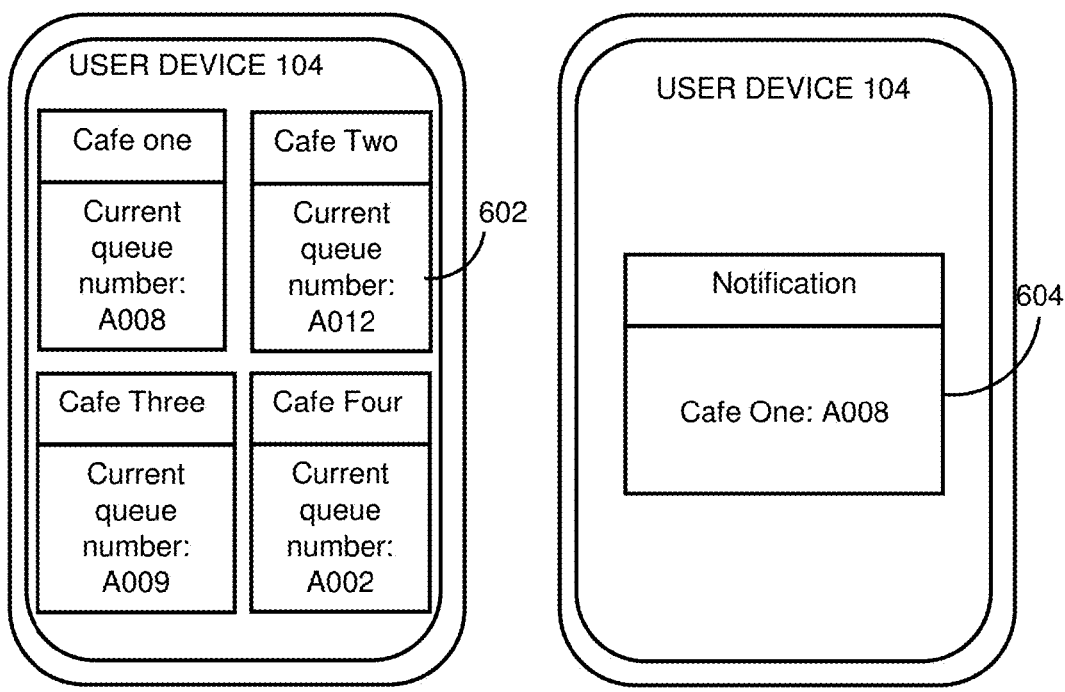
FIG. 6 illustrates an interface of the user device 104, in accordance with an embodiment of the present disclosure.

In one embodiment, the user may utilize the queue ticket 506 in order to subscribe/register with the respective queue channel via the mobile device 104 or an application residing on the mobile device 104. Specifically, the user may scan a QR-code on the queue ticket 506 issued by the kiosk device 108. The user may scan the QR-code either from the queue ticket displayed on the display of the kiosk device 108 or from the QR-code imprinted on the print of the queue ticket. The user may transmit the QR-code within the service registration request being sent to the queue management server 102 via the mobile device 104. FIG. 6 illustrates an interface of the mobile device 104, in accordance with an embodiment of the present disclosure. As shown, the mobile device 104 may be enabled to receive notifications 602 broadcasted by the queue management server 102 via the push notification controller 216 (shown in FIG. 4.) The push notification controller 216 comprises a notification broadcasting agent (not shown) configured to push notifications on the mobile device 104. In an embodiment, each notification is indicative of status of the queue in terms of the queue number being called/served as shown in above table 1. Specifically, each queue status indicates a position of the service request of a user in a particular queue after every predefined time interval.

As shown in FIG. 6, the mobile device 104 may be provided with multiple notifications pertaining to the status of the multiple queues by the push notification controller 216. In one example, a notification 602 pertaining to four different cafes (e.g. cafe one, cafe two, cafe three and cafe four) of the restaurant may be displayed on the mobile device 104 simultaneously. A notification 604 of a particular cafe (e.g. cafe one) may be popped-up on the mobile device 104 based upon clicking upon a particular notification displayed on the mobile device 104. In some embodiments, the mobile device 104 may provide an option for the user/customer to unsubscribe/de-register with the queue channels for termination of the receipt of the status of the queues in form of the notifications.

Figure 7:
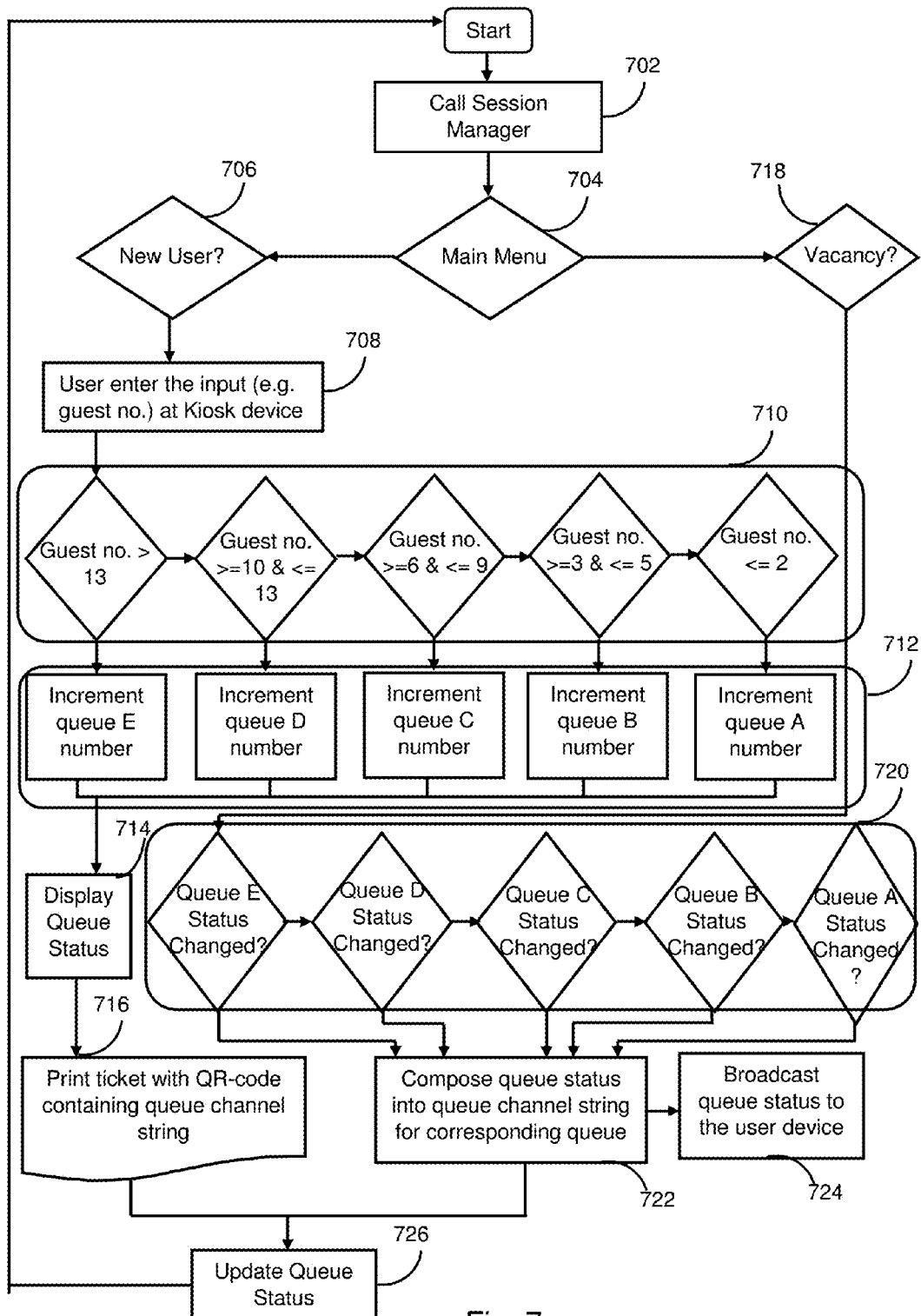
FIG. 7, FIG. 8A, FIG. 8B and FIG. 9 collectively illustrates a method implemented by the system 102 in conjunction with the user device 104 and the kiosk device 108, in accordance with an embodiment of the present disclosure.
Figure 8A:
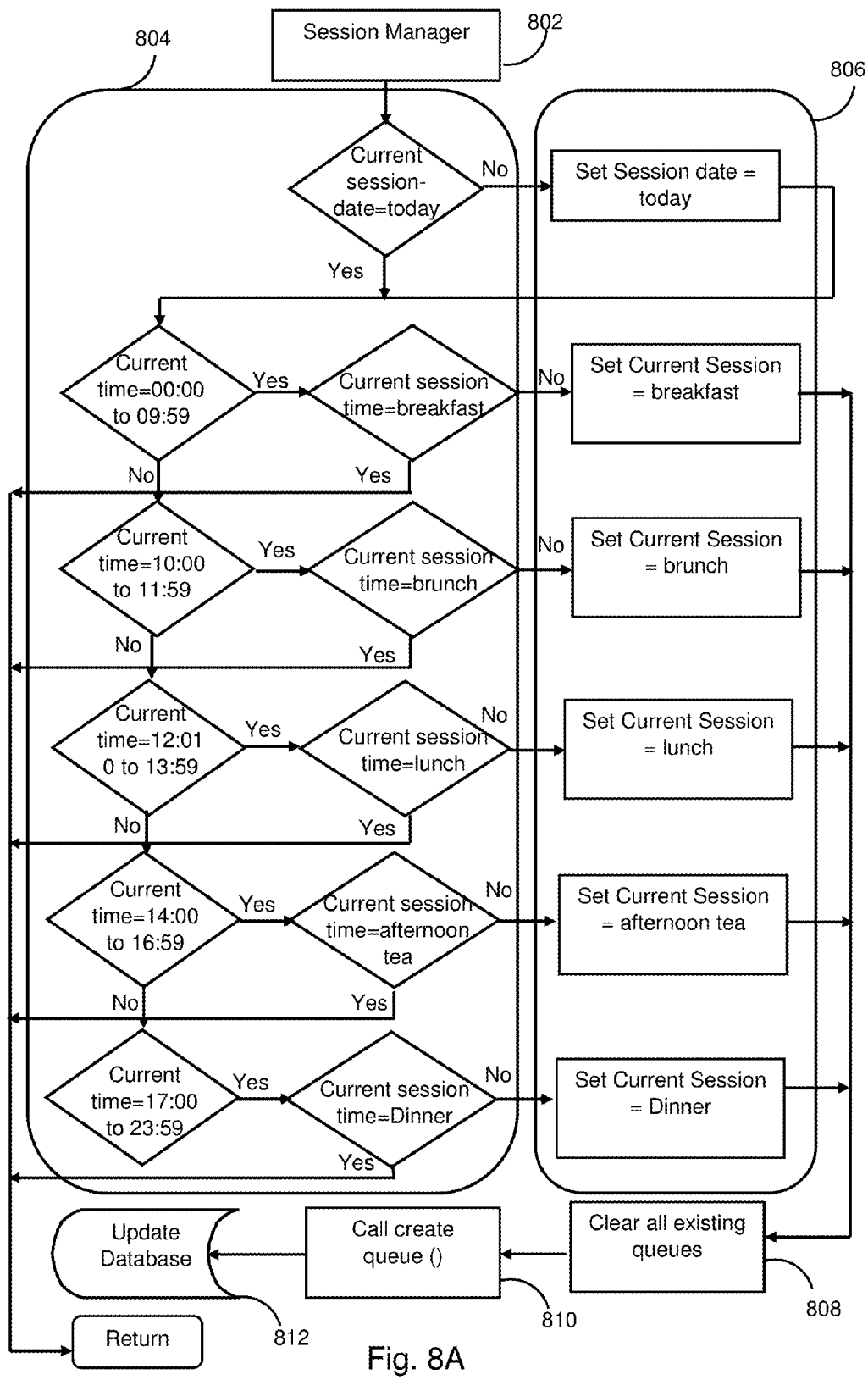
Figure 8B:
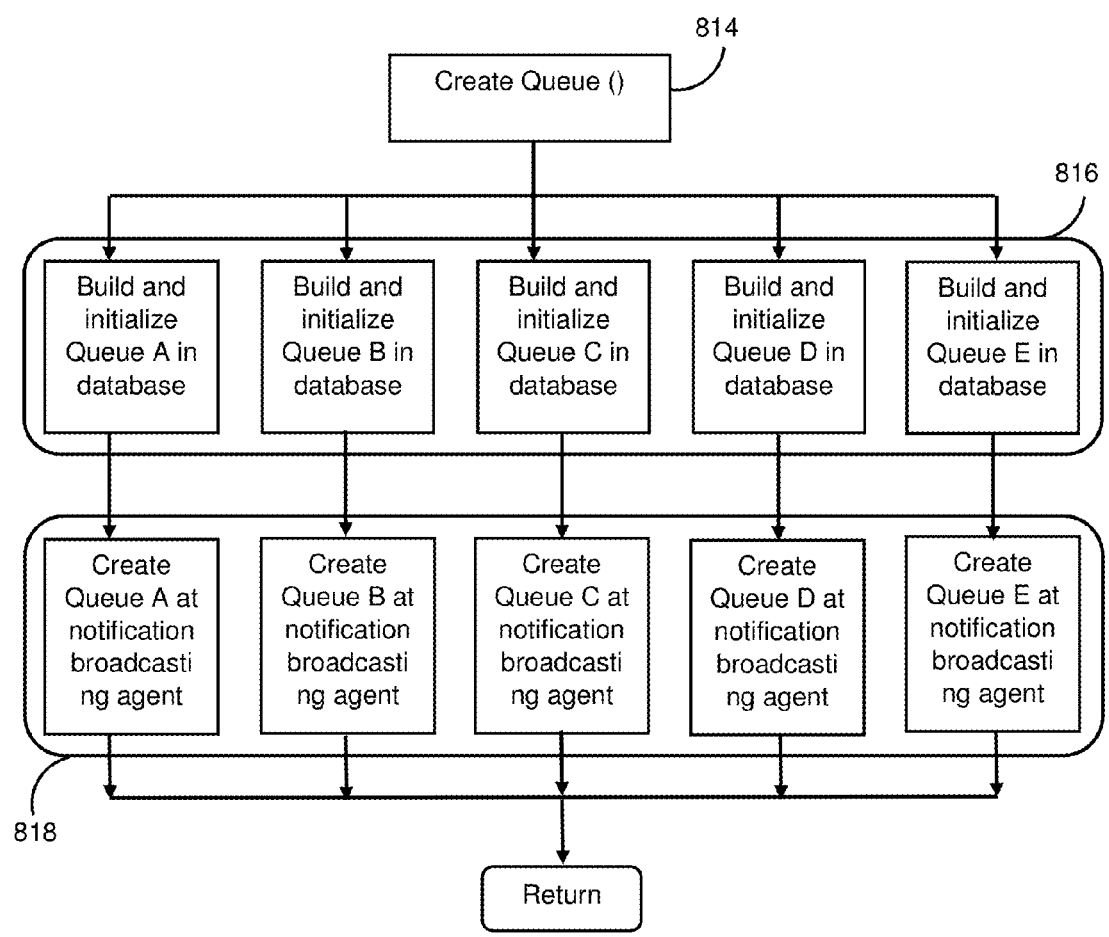

Referring to FIG. 7, FIG. 8A and FIG. 8B illustrates flow diagrams depicting steps implemented by the queue manager 214 in conjunction with the session manager 212 and the push notification controller 216 of the queue management server 102 for facilitating the creation & maintenance of a queue, enabling the subscription of the user to the queue channel associated to the queue and sending notifications indicative of status of the queue to the user, in accordance with embodiments of the present disclosure. As shown in FIG. 7, at block 702, the queue manager 214 may call a session manager routine to be executed by the session manager 212. The session manager routine is illustrated in FIG. 8A and FIG. 8B and described as below.

As illustrated in FIG. 8A, at block 802, the session manager 212 may initialize the session manager routine. At block 804, the session manager 212 may check whether a current session falls into a present date and time slot. It is to be noted that the correct session-date is today and the correct session-time is one of the timeframe selected from a group comprising "Breakfast", "Brunch", "Lunch", "Afternoon-Tea" and "Dinner". Further, it is to be noted that the correct current-session-date must have the date of today and the correct current-session should fall into the session corresponding to the present timeframe. At block 806, it is necessary for the session manager 212 to set the queue manager 214 to the correct session. At block 808, the session manager may clear all the existing queues while setting the new session. For example, the session manager 212 may clear and delete queue datum and queue channel strings set in the previous session. Based upon the deletion and clearing of the queues (and accordingly the queue channel strings) pertaining to the previous sessions, the users registered to the queue channels from the previous sessions may no longer receive the current queue status broadcasting notifications corresponding to the queue channels from the previous sessions. After a new session is set, at block 810, the queue manager 214 may instruct the session manager 212 to call a create queue routine to be executed by the session manager 212. The create queue routine method is illustrated in FIG. 8B described below.

As illustrated in FIG. 8B, at block 814, the session manager 212 may initialize the session manager routine. At block 816, the session manager 212 may create and initialize Queue A to Queue E. It must be understood the number of queues created are not limited to five (as shown) and is dependent upon the actual number of service requests received by the service location. The queues created may be updated into the database 220 of the queue management server 102. Further, the queue numbers for all the queues created may be set back to zero in the database 220 after the creation and the initialization of the queues. At block 818, based upon the initialization of the queues, a new push notification queue channel strings corresponding to each queue (Queue A to Queue E) may be created that is to be broadcasted via a dedicated notification broadcasting agent configured by the push notification controller 216 within the queue management server 102. It is to be noted that each queue channel string is a unique identifier used for broadcasting the status of the queue and therefore each queue channel string may comprise at least a merchant-id, a current date, a session number, and a queue number. In one example, the structure of each queue channel string may be as shown in below Table 2:

TABLE 2

Structure of queue-channel string

| Merchant-id | Merchant-branch-id | Queue-id | Date | Session-number | Merchant-short-name | Merchant-long-name | Last-issued-queue-number | Last-called-queue-number |
| --- | --- | --- | --- | --- | --- | --- | --- | --- |

As can be seen from the Table 2, the queue channel string comprises at least one of a service location identifier (or a merchant-id) identifying a service location, a branch identifier (or a merchant-branch-id) identifying a branch of the service location, a queue identifier (or a queue-id) identifying the queue, a date identifying a date of creation of the queue, a service provider name (or a merchant-short name or a merchant-long-name or a combination thereof) identifying the service provider, a last-issued-queue-number for identifying a lastly issued queue number and a last-called-queue-number for identifying a lastly called queue number. It must be understood that the data structure of each queue channel string is related to a specific service provider, a specific date, a specific session, and to a specific queue. Therefore, only the customers/users subscribed to the queue channel of the specific queue may be enabled to receive queue status push notifications pertaining to the said queue channel via the respective notification broadcasting agents (shown at block 818) of the respective queues. Now referring to FIG. 8A, at block 812, after the execution of the create queue routine shown in FIG. 8B, the session manager 212 may update the queues related information in the database 220. The session manager 212 may thereafter return the execution of the method to the queue manager 214 to the main logic shown in block 704 of FIG. 7.

Now referring to FIG. 7, at block 704, the queue manager 214 may monitor triggering of an event which is either a receipt of new user (at block 706) or a vacancy created in the queue (at block 718). If the event triggered is the receipt of the new user, then at block 708, the new user may provide an input (e.g. a guest number) at the kiosk device 108. At block 710, the queue manager 214 may verify the number of guests provided by the user at the kiosk device 108. At block 712, based upon the number of guests, the queue manager 214 may assign a queue number to the new user and add the queue number into a queue corresponding to the queue number assigned. At block 714, the queue manager 214 may display the current queue status of the queue assigned to the new user on the screen of the service location as-well-as may display the queue position on the display of the kiosk device 108. At block 716, the kiosk device 108 may issue the queue ticket containing the QR-code. The QR-code may comprise the queue channel string (having the structure shown in Table 2) corresponding to the queue channel associated to the queue assigned to the new user. The new user may print the queue ticket using the print function present within the kiosk device 108.

Now referring to FIG. 7, if the event triggered is the vacancy in the queue (at block 718), the queue manager 214 may check the change in status of each queue at block 720. At block 722, based on the change of queue status, the queue manager 214 may insert the updated queue status information into the corresponding queue channel strings. Further, after the insertion of the updated queue status information into the corresponding queue channel strings, the push notification controller 216 may broadcast push notifications indicating the latest queue status to the mobile devices 104 of the users who have joined the queues. At block 726, the updated queue status information into the corresponding queue channel may be updated in the database 220. After the execution of the step at block 726, the method is returned back to the main menu at block 704 waiting for the triggering of the event (at block 706 or 718) until the session is expired.

Figure 9:
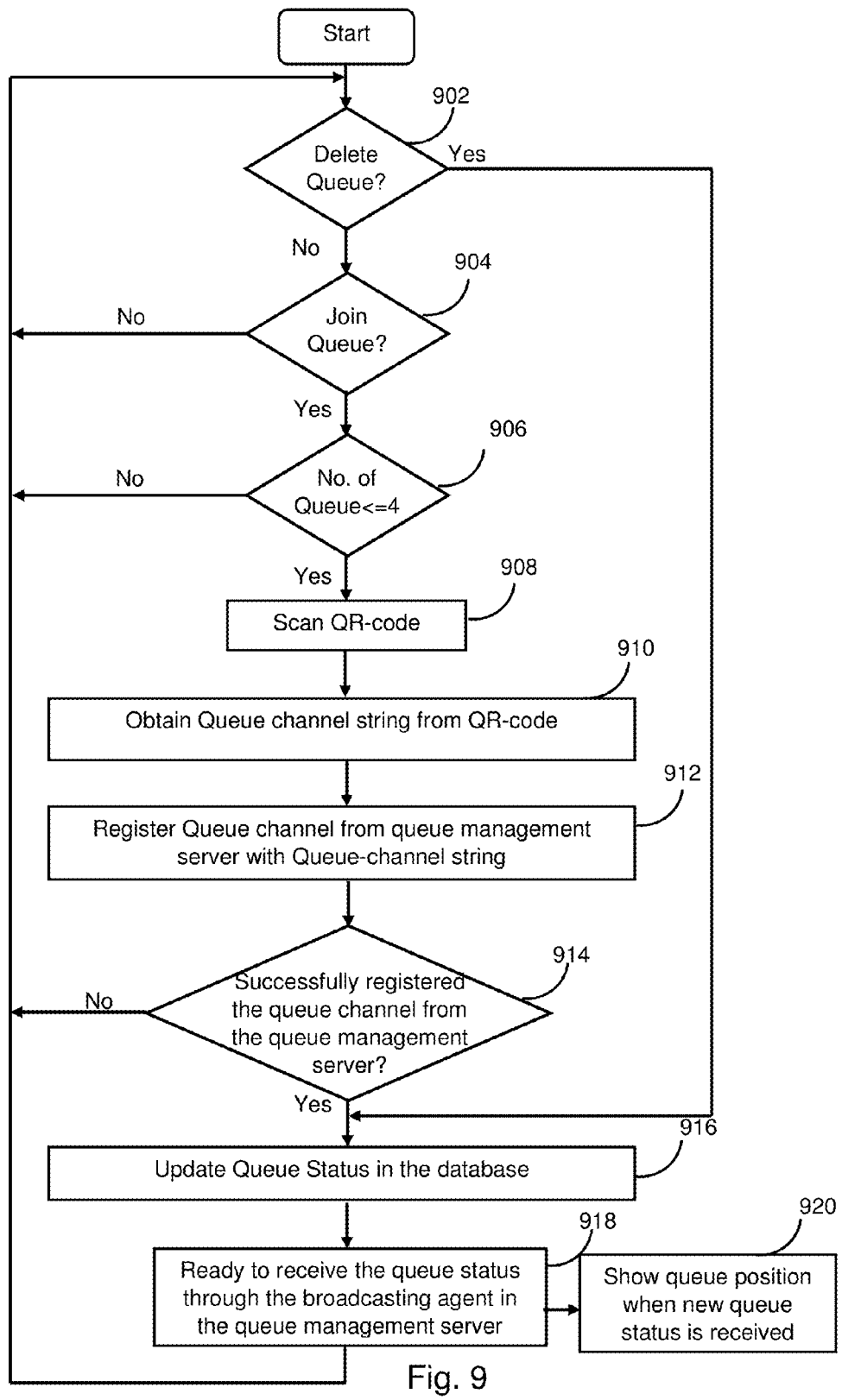

Now referring to FIG. 9 is a flow diagram depicting steps implemented by the mobile device 104 (or the application residing on the mobile device 104, hereinafter referred as "mobile app"), in accordance with an embodiment of the present disclosure. As shown, at block 904, the mobile app may be in the status of awaiting a new user to join a new queue. In one example, each mobile app may be enabled to register/subscribe maximum four queues. At decision block 906, if it is determined that the number of queues is less than or equal to four, then at block 908, the user may scan the QR-code printed on the queue ticket via the mobile app. At block 910, based upon the scanning of the QR-code, the user may extract the queue channel string from the QR-code scanned At block 912, the user may register/subscribe the mobile app with the queue channel from the queue management server 102 along with the respective queue channel string. At decision block 914, if it is determined that the user has been successfully subscribed/registered with the queue management server 102, the recent queue status (i.e. inclusion of the user in the queue) is updated in the database 220. At block 918, the mobile app may be ready to receive the queue status through the notification broadcasting agent contained in the push notification controller 216 within the queue management server 102. At block 920, the user may be notified with the notifications indicating the queue position in the queue as and when new queue status is received. It is to be noted that the mobile app may be apdated to continuously receive the queue status notifications broadcasted via the notification broadcasting agent contained in the push notification controller 216 until the expiry of the session or the user has unsubscribed the queue channel by deleting the queue at block 902.

Figure 10:
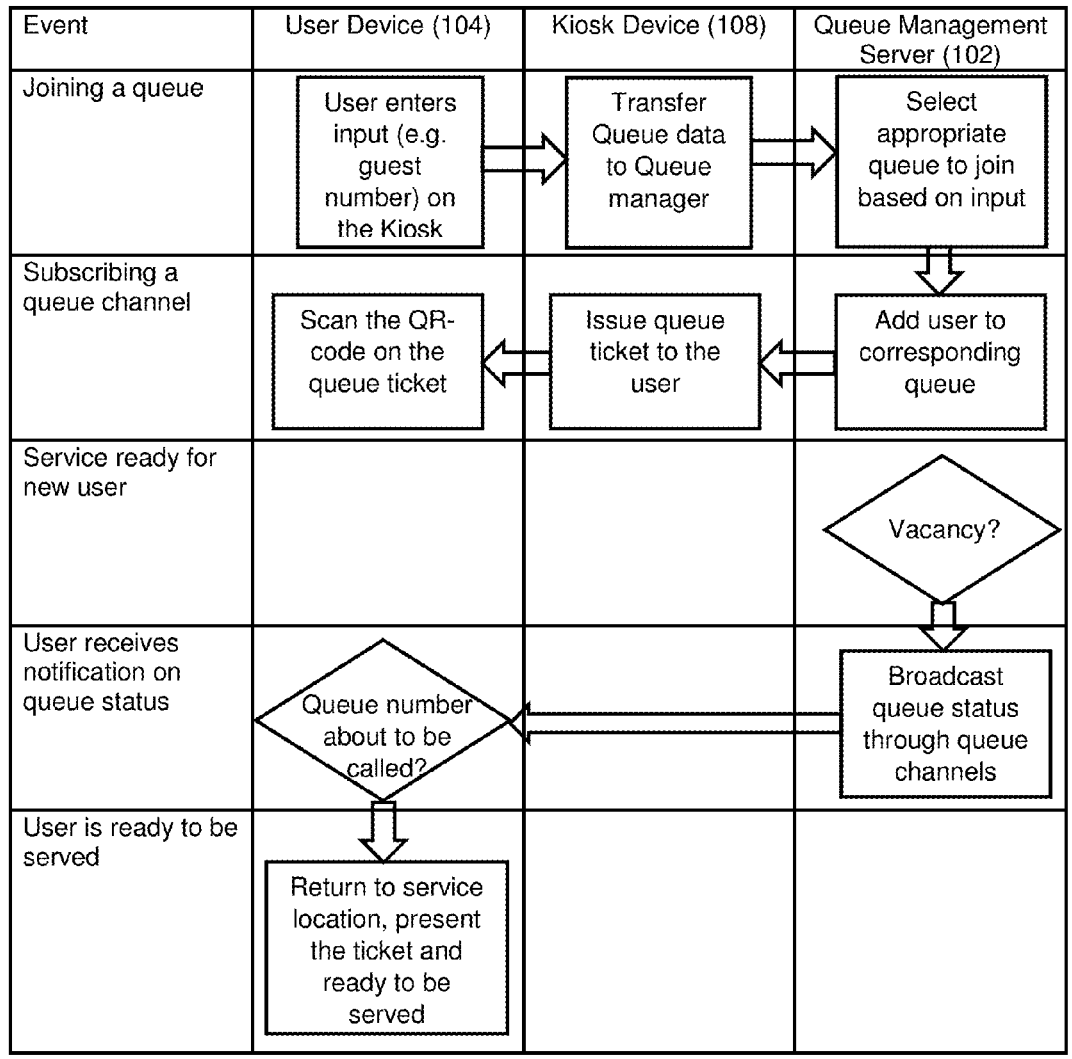
FIG. 10 illustrates a sequence of events depicting an exemplary implementation of the system 102 in a restaurant, in accordance with an embodiment of the present disclosure.

Referring to FIG. 10 is a block diagram illustrating a sequence of events depicting an exemplary implementation of the system 102, in accordance with an embodiment of the present disclosure.

In this exemplary implementation, assume the service location is a restaurant and the aforementioned method is executed for managing queues in the restaurant. Normally, every morning, when the restaurant is opened, a user acting as a front executive of the restaurant may access the queue management server 102 via his/her mobile device 104. The executive may initiate a day session on the queue management server 102. The queue management server 102 may create five virtual queues corresponding to difference table sizes. Based upon creation of the five virtual queues corresponding to the day session, the system is initialized and ready for the queuing operation. Now, a customer may approach the kiosk device 108 installed at the restaurant location and provide the number of guests on the kiosk device 108. The kiosk device may transmit the queue data to the queue manager 214 of the queue management server 102. Based upon the number of guests received from the kiosk device 108, the queue manager 214 may determine and select an appropriate queue to be joined by the user. The queue manager 214 may add the user in the appropriate queue and triggers the kiosk device 108 to issue a queue ticket to the customer. As illustrated in FIG. 5B, the queue ticket may include a queue number and a QR code containing the queue channel string. After the queue ticket is received by the user, the user may scan the QR-code using his/her mobile device (e.g. smartphone). Based upon the scanning of the QR-code, the queue channel subscription is successfully completed and the user's smartphone is ready to receive notifications sent through the queue channel. The user may be free to walk away from the restaurant as he/she will be kept up-to-dated by the notifications sent to her smart phone.

As depicting in table 1, the front executive of the restaurant may be provided with the status of the queues on his/her mobile device 104 via the queue management server 102. At any time, when a table is ready for the next customer, the front executive, via the queue management server 102, may change the queue status to "Called". The updated status may trigger a notification to be sent and broadcasted, via the push notification controller 216, to all mobile devices 104 subscribed to the respective queue channel. Based upon the notifications received on the mobile device 104 (as shown in FIG. 6), the customer may decide an appropriate time for visiting the restaurant to be served by a specific cafe in the restaurant. In the meantime, the customer may shop at shopping mall or perform any other leisure activity.

Finally, the customer may return to the restaurant when his/her queue number is called. The customer may present the queue ticket to the front executive at the restaurant and ready to get served with the food and beverage services offered by the restaurant. After the customer is ready to be served, the customer may de-register/unsubscribe from the queue channel and thereby stop receiving the queue status notifications on the smart phone. Further, the front executive may change the status of the queue number just called from "Called" to "Served". The same cycle repeats until the next session is initialized by the front executive at the restaurant.

Exemplary embodiments discussed above may provide certain advantages. Though not required to practice aspects of the disclosure, these advantages may include those provided by the following features.

Some embodiments of the present disclosure enable system and method for continuously monitoring the status of the service request of a user in the queue and notify the user the latest position of the service request while the user is at a remote place from a service location providing the service corresponding to the service request.

Some embodiments of the present disclosure enable system and method for enabling the user to subscribe with multiple queues belonging to multiple service locations simultaneously such that a service location's queue calling the user's service request earlier may be selected by the user for availing the service instantaneously.

Although implementations for methods and systems for managing a queue of one or more service requests have been described in language specific to structural features and/or methods, it is to be understood that the appended claims are not necessarily limited to the specific features or methods described. Rather, the specific features and methods are disclosed as examples of implementations for managing a queue of one or more service requests.

What is claimed is:

1. A system for managing a queue of one or more service requests, the system comprising:
   a processor; and
   a memory coupled with the processor, wherein the processor is configured to execute programmed instructions stored in the memory for
   creating a queue of one or more service requests pertaining to one or more services delivered through a service location;
   receiving a queue registration request from a user device in order to register a service request associated with a user in the said queue, wherein the queue registration request comprises a QR-code generated in real time, via a kiosk device installed at the service location, based upon an input received from the user on the kiosk device, and wherein the input at least comprises number of service seekers for the one or more services;
   processing the queue registration request to register the service request in the said queue thereby recording a position of the service request in the said queue;
   monitoring status of the queue in order to track change in the position of the service request of the user in the said queue;
   updating the status of the queue to the user on the user device thereby indicating the chance in position of the service request to the user;
   wherein the QR-code further comprises a string including a service location identifier for identifying the service location, a branch identifier for identifying a branch of the service location, a queue identifier for identifying the queue created by the processor, a date for identifying a date of creation of the queue, a service provider name for identifying the service provider, a last-issued-queue-number for identifying a lastly issued queue number and a last-called-queue-number for identifying a lastly called queue number;
   wherein updating the status of the queue further comprises updating the last-issued-queue-number and the last-called-queue-number within the string, and wherein the string updated with the last-issued-queue-number and the last-called-queue-number is communicated to the user device via the notification message, and
   further comprising enabling the user to subscribe multiple queue channels corresponding to multiple queues and thereby determine at least one queue of the multiple queues capable of serving at least one service request of the user at a predetermined time ahead of other queues by continuously monitoring and updating status of each of the multiple queues.

2. The system of claim 1, wherein the queue is created for a session time set by a session server communicatively coupled with said processor, wherein the queue is created if a current time slot is within the session time, and wherein the queue is deleted after the expiry of the session time, and wherein the queue created is configured to accommodate at least one service request until expiry of the session time.

3. The system of cam 1, wherein the QR-code is scanned by the user device and transmitted within the said queue registration request.

4. The system of claim 3, wherein the user device is subscribed to a queue channel corresponding to the queue based upon the receipt the queue registration request comprising the said QR-code.

5. The system of claim 2, wherein the status of the queue is continuously monitored and recorded for one or more instances belonging to the session time, and wherein the status the queue is monitored and recorded for each instance in order to track the change in status of the queue from a previous instance.

6. The system of claim 5, wherein the status of the queue and thereby the change in the position of the service request in the queue at each instance is provided to the user in form of a notification message on the user device.

7. A method for managing a queue of one or more service requests, the method comprising:
   creating, via a processor, a queue of one or more service requests pertaining to one or more services delivered through a service location;
   receiving, via the processor, a queue registration request from a user device in order to register a service request associated with a user in the said queue, wherein the queue registration request comprises a QR-code generated in real time, via a kiosk device installed at the service location, based upon an input received from the user on the kiosk device, and wherein the input at least comprises number of service seekers for the one or more services;

processing, via the processor, the queue registration request to register the service request in the said queue thereby recording a position of the service request in the said queue;

monitoring, via the processor, status of the queue in order to track change in the position of the service request of the user in the said queue;

updating, via the processor, the status of the queue to the user on the user device thereby indicating the change in position of the service request to the user;

wherein the QR-code further comprises a string including a service location identifier for identifying the service location, a branch identifier for identifying a branch of the service location, a queue number for identifying the queue number created by the processor, a date for identifying a date of creation of the queue, a service provider name for identifying the service provider, a last-issued-queue-number for identifying a lastly issued queue number and a last-called-queue-number for identifying a lastly called queue number;

wherein updating the status of the queue further comprises updating the last-issued-queue-number and the last-called-queue-number within the string, and wherein the string updated with the last-issued-queue-number and the last-called-queue-number is communicated to the user device via the notification message, and further comprising enabling the user to subscribe multiple queue channels corresponding to multiple queues and thereby determine at least one queue of the multiple queues capable of serving at least one service request of the user at a predetermined time ahead of other queues by continuously monitoring and updating status of each of the multiple queues.

8. The method of claim 7, wherein the queue is created for a session time set by a session server communicatively coupled with said processor, wherein the queue is created if a current time slot is within the session time, and wherein the queue is deleted after the expiry of the session time, and wherein the queue created is configured to accommodate at least one service request until expiry of the session time.

9. The method of claim 7, further comprising scanning, via the user device, the QR-code to be transmitted within the said queue registration request.

10. The method of claim 9, further comprising subscribing, via the processor, the user device to a queue channel corresponding to the queue based upon the receipt the queue registration request comprising the said QR-code.

11. The method of claim 8, wherein the status of the queue is continuously monitored and recorded for one or more instances belonging to the session time, and wherein the status the queue is monitored and recorded for each instance in order to track the change in status of the queue from a previous instance.

12. The method of claim 11, wherein the status of the queue and thereby the change in the position of the service request in the queue at each instance is provided to the user in form of a notification message on the user device.

13. A non-transitory computer readable medium storing program for managing a queue of one or more service requests, the program comprising:

a program code for creating a queue of one or more service requests pertaining to one or more services delivered through a service location;

a program code for receiving a queue registration request from a user device in order to register a service request associated with a user in the said queue;

a program code for processing the queue registration request to register the service request in the said queue thereby recording a position of the service request in the said queue wherein the queue registration request comprises a QR-code generated in real time, via a kiosk device installed at the service location, based upon an input received from the user on the kiosk device, and wherein the input at least comprises number of service seekers for the one or more services;

a program code for monitoring status of the queue in order to track change in the position of the service request of the user in the said queue;

a program code for updating the status of the queue to the user on the user device thereby indicating the change in position of the service request to the user;

wherein the QR-code further comprises a string including a service location identifier for identifying the service location, a branch identifier for identifying a branch of the service location, a queue identifier for identifying the queue created by the processor, a date for identifying a date of creation of the queue, a service provider name for identifying the service provider, a last-issued-queue-number for identifying a lastly issued queue number and a last-called-queue-number for identifying a lastly called queue number, wherein updating the status of the queue further comprises updating the last-issued-queue-number and the last-called-queue-number within the string, and wherein the string updated with the last-issued-queue-number and the last-called-queue-number is communicated to the user device via the notification message, and further comprising enabling the user to subscribe multiple queue channels corresponding to multiple queues and thereby determine at least one queue of the multiple queues capable of serving at least one service request of the user at a predetermined time ahead of other queues by continuously monitoring and updating status of each of the multiple queues.

* * * * *

UNITED STATES PATENT AND TRADEMARK OFFICE
CERTIFICATE OF CORRECTION

PATENT NO. : 9,747,566 B2  
APPLICATION NO. : 15/289968  
DATED : August 29, 2017  
INVENTOR(S) : Chung Man Ng and Wai Hung Edmond Cheung It is certified that error appears in the above-identified patent and that said Letters Patent is hereby corrected as shown below:

In the Claims

Column 14 Line 8 delete "chance" and insert --change--.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*